3,385,789
COMPOSITION AND METHOD FOR
SHALE CONTROL
Charles M. King, Raceland, La.
(Louise Drive, P.O. Drawer E, Lockport, La. 70374)
No Drawing. Filed Mar. 5, 1964, Ser. No. 349,764
11 Claims. (Cl. 252—8.5)

ABSTRACT OF THE DISCLOSURE

A composition and method utilized in earth boring to control heaving shale and inhibit water loss which composition comprises clay, pulverized lignite, graphite and asphalt, said method being carried forth by circulating said composition with the drilling mud, while drilling, in sufficient amounts to inhibit shale hydration and water loss.

---

This invention comprises a novel and useful composition and method for shale control and more particularly pertains to an additive for drilling fluid which will substantially reduce or eliminate both the problem of the loss of water from the drilling fluid into a porous formation and the subsequent swelling and/or deterioration of the formation from the water absorbed thereby and the hazard of a cave-in of the formation into the well bore.

In the drilling of deep wells such as those intended for the recovery of oil or gas, great difficulty has been encountered when drilling through certain formations. In particular the drilling of wells through shale formations poses serious problems.

When shale absorbs water, it expands or swells and frequently caves in or collapses into the well bore with resultant damage to the drilling operations and sometimes the loss of the well. Since drilling mud necessarily contains a large proportion of water, the presence of the latter contributes to and is primarily the cause of the condition known as "heaving shale." Methods to overcome these conditions have not been entirely successful.

It is therefore a principal object of this invention to provide a method and means for satisfactorily overcoming the problem of "heaving shale."

A further object of the invention is to provide a method and a composition which shall effectively reduce the loss of water from a drilling mud into a formation and will further fill up the interstitial pore spaces of the formation at the well bore and bond and consolidate the formation particles into a stable mass.

It is a further object of the invention to provide a composition and a method which may be readily applied to all types of drilling muds as an additive thereto and to use the circulation of the drilling mud for conveying the additive to those regions of a formation penetrated by the well bore which may be efficaciously treated by the additive.

A still further purpose of the invention is to provide a composition which shall be substantially devoid of chemical reaction with various components of a drilling mud and with the various fluids encountered in drilling operations and which shall be especially effective for the dual purposes of filling the interstitial pore spaces and sealing the face of the formation against the penetration of drilling mud thereinto, and further consolidating or bonding together the particles of the formation into a stable mass having a reduced tendency to cave-in or collapse into the well bore.

Yet another purpose of the invention is to provide a drilling fluid additive which in performing its desired functions will not produce a filter cake of excessive thickness on the well bore which will contribute toward interference with the movement of the drilling string either into or out of the well bore.

It is yet another purpose of the invention to provide a drilling fluid additive which shall consist of readily available relatively inexpensive components, capable of being easily combined in a desired proportion and capable of safe and satisfactory storage for relatively long periods of time and transportation without deterioration thereof.

A still further object of the invention is to provide a combined sealing and consolidating composition which may be readily mixed with and may remain in suspension in the drilling fluid without creating any problems as to its introduction into the fluid or its passage through the pumps of the fluid circulating system.

These together with other objects and advantages which will become subsequently apparent reside in the components of the composition and its method of use in controlling shale formations as more fully hereinafter described and claimed.

Basically, the drilling mud additive of this invention consists of a composition of clay, pulverized lignite, graphite and powdered asphalt. A preferred composition with the relative proportions being by weight and which has proved to be extremely satisfactory in use consists of the following, with a permissible variation of about 4%:

| | Parts |
|---|---|
| Clay | 50 |
| Pulverized lignite | 25 |
| Graphite | 20 |
| Powdered asphalt | 10 |

A preferred type of clay which has proven to be extremely satisfactory for the purposes of this invention has the following characteristics and identity:

Produced from a unique deposit of sedimentary kaolinite near Graniteville, S.C., composition hydrated aluminum silicate, $Al_2O_3$—38% approximately; $SiO_2$—45% approximately; particle shape—flat hexagonal plates; abrasion—extremely low.

Screen analysis, percent:

| | |
|---|---|
| 200 mesh | 99.5 |
| 325 mesh | 99.0 |

Particle size, percent:

| | |
|---|---|
| Minus 2 microns | 87–92 |
| Plus 5 microns | 3–5 |
| Moisture (maximum), percent | 1 |
| Bulk density, pounds per cubic foot | 36 |
| Water suspension (after 48 hours), percent | 70–85 |
| pH | 4.5–5.5 |
| Specific gravity | 2.60 |
| Viscosity (Stormer), cp. at 35% water slip | 500 |
| Oil absorption, cc./100 gms. | 34–36 |

The preferred form of pulverized lignite possesses the following qualities and characteristics:

Grade—pulverized lignite.
Composition—the mineral leonhardite; a salt of mixed natural humic acids.
Purity—leonhardite about 85%. Balance aluminum silicate, alkaline earth sulphates, silica and other minerals.
Chemical composition—carbon, 55% to 70%; oxygen, 25% to 33%; hydrogen, 4% to 6%; sulphur, 0.4% to 2%.
Moisture content—10% to 20% as shipped.
Average fineness—35% passing 200 mesh screen.
Solubility in alkali—85% average.
The powdered asphalt component preferred for the composition of this invention is produced from an asphaltic crude oil, is pulverized and has the following characteristics:

|  | Minimum | Maximum | Typical |
|---|---|---|---|
| Softening point (R. & B.), °F | 300 | 320 | 316 |
| Penetration at 77° F | 3 | 5 | 4½ |
| Foreign material |  |  | None. |
| Specific gravity at 77° F | 1.01 | 1.05 | 1.045 |
| Moisture, percent |  | 0.5 | None. |
| Penetration at 32° F. (200 grams per 60 seconds) |  |  | 3 |
| Penetration at 115° F. (50 grams per 5 seconds) |  | 8 | 5 |
| Soluble in CCl₄, percent | 99.5 |  | 99.7 |
| Acetone insoluble, percent | 50 | 70 | 66.8 |
| Benzene insoluble, percent |  | 0.1 | .01 |
| Loss in heating, 50 grams, 5 hours at 325° F., percent |  | 0.2 | .01 |
| Ash, percent |  | 0.5 | 0.3 |
| Asphaltenes, percent |  |  | 51 |

SIEVE ANALYSIS

| Sieve No. | Percent passing | Specification |
|---|---|---|
| 8 | 100 | 100% passing. |
| 10 | 99.3 | Do. |
| 14 | 99.6 | Do. |
| 30 | 97.4 | Do. |
| 50 | 63.1 | 50% min. passing. |
| 100 | 24.1 | Do. |
| 200 | 0.7 | Do. |

The graphite employed is known commercially as Southwestern 92 Flake Graphite and is 100% natural crystalline flake graphite and contains no amorphous graphite or other carbon adulterants. It carries a minimum graphite carbon guarantee of 92% which is sized to a maximum of 6% on 100 mesh screen with 60% to 80% passing a 200 mesh screen.

When the drilling operation progresses to a formation where loss of fluid in the formation or the possibility of the formation deteriorating into the well bore such as heaving shales may occur, the composition of this invention is added to the drilling fluid preferably in the mud pit. The amount of composition added will of course vary with the characteristics and the demands of the formation to be treated. The circulation of the drilling fluid with the added fluids admixed therewith will convey the additive to the region at which the loss of fluid is occurring. Inward progression of the drilling fluid into the formation at that region, commonly known as a "thief" formation will carry the additive with it into the interstices of the formation. There the clay will be carried into the interstitial or porous spaces while the powdered asphalt will bond or consolidate the formation particles. Thus, ingress of water into the formation is halted thereby preventing further loss of the drilling fluid and also preventing the absorption of water by shales or other water absorbing elements in the formation. The asphalt will bond or consolidate the particles thereby rendering them more stable and preventing any tendency to slough or cave in to the well bore.

Although the composition is particularly adapted and beneficial in treating heaving shale formations, it is also beneficial in any formation which exhibits a tendency of either robbing the drilling fluid or of absorbing water and expanding or deteriorating as a result thereof.

What is claimed as new is as follows:

1. A shale and water loss control composition for use as an additive to drilling mud in well drilling consisting on the basis of parts by weight of 50 parts clay, 25 parts pulverized lignite, 20 parts graphite and 10 parts powdered asphalt.

2. A drilling mud additive composition for shale and water loss control consisting on the basis of weight of clay, lignite, graphite and asphalt, said additive containing about 25% comminuted lignite, 20% graphite, 10% powdered asphalt and the remainder consisting of clay.

3. The composition of claim 2 wherein said clay is a hydrated alumina silicate containing on the basis of weight approximately 38% of $Al_2O_3$ and approximately 45% $SiO_2$, said clay being of a particle size with 99.5% passing through a 200 mesh screen and 99% passing through a 325 mesh screen.

4. The composition of claim 2 wherein said lignite consists of on the basis of weight about 85% powdered leonhardite.

5. The composition of claim 2 wherein said graphite is a natural crystalline flake graphite free of amorphous graphite and other adulterants and having a minimum carbon content on the basis of weight of 92% and of a particle size wherein 60% to 80% will pass through a 200 mesh screen with a maximum of 6% retained on a 100 mesh screen.

6. The composition of claim 2 wherein said asphalt is of a particle size wherein 100% passes through a No. 8 sieve, 95% through a No. 30 sieve and with substantially 25% passing through a No. 100 sieve.

7. A method for controlling shale and water loss in oil wells comprising the steps of combining and circulating while drilling with a water base drilling mud an additive consisting on the basis of parts by weight of 50 parts clay, 25 parts pulverized lignite, 20 parts graphite and 10 parts powdered asphalt, said additive being added to the drilling mud in an amount sufficient to inhibit shale hydration and water loss.

8. The method of claim 7 wherein said clay is a hydrated alumina silicate containing on the basis of weight approximately 38% of $Al_2O_3$ and approximately 45% $SiO_2$, said clay being of a particle size with 99.5% passing through a 200 mesh screen and 99% passing through a 325 mesh screen.

9. The method of claim 7 wherein said lignite consists of on the basis of weight about 85% powdered leonhardite.

10. The method of claim 7 wherein said graphite is a natural, crystalline flake graphite free of amorphous graphite and other adulterants and having a minimum carbon content on the basis of weight of 92% and of a particle size wherein 60% to 80% will pass through a 200 mesh screen with a maximum of 6% retained on a 100 mesh screen.

11. The method of claim 7 wherein said asphalt is of a particle size wherein 100% passes through a No. 8 sieve, 95% through a No. 30 sieve and with substantially 25% passing through a No. 100 sieve.

References Cited

UNITED STATES PATENTS

| | | | |
|---|---|---|---|
| 2,109,858 | 3/1938 | Cannon | 252—8.5 |
| 2,329,878 | 9/1943 | Cerf | 252—8.5 |
| 2,650,197 | 8/1953 | Rahn | 252—8.5 |
| 2,773,670 | 12/1956 | Miller | 252—8.5 |
| 2,812,161 | 11/1957 | Mayhew | 252—8.5 |
| 3,079,334 | 2/1963 | Clem | 252—8.5 |

OTHER REFERENCES

Rogers, Composition and Properties of Oil Well Drilling Fluids, published 1963 by Gulf Pub. Co. of Houston, Texas, pp. 334 to 336, 339 to 341 and 422.

LEON D. ROSDOL, *Primary Examiner.*

H. B. GUYNN, *Assistant Examiner.*